United States Patent [19]

Bielen, Jr. et al.

[11] 4,413,589
[45] Nov. 8, 1983

[54] COLLAPSIBLE ANIMAL LEASH

[76] Inventors: Theodore J. Bielen, Jr.; Denise M. Bielen, both of 1024 Amito Ave., Berkeley, Calif. 94705

[21] Appl. No.: 373,358

[22] Filed: Apr. 30, 1982

[51] Int. Cl.³ .............................................. A01K 27/00
[52] U.S. Cl. ................................................... 119/109
[58] Field of Search ........................ 119/109, 106, 126

[56] References Cited

U.S. PATENT DOCUMENTS 2,861,547 11/1958 Dale .................................... 119/109
3,752,127 8/1973 Baker ................................... 119/109

FOREIGN PATENT DOCUMENTS 784166 10/1957 United Kingdom ................ 119/109

Primary Examiner—Hugh R. Chamblee
Attorney, Agent, or Firm—Theodore J. Bielen, Jr.

[57] ABSTRACT

A collapsible animal leash which may be attached to an animal collar having an endless loop member. The endless loop member may be held to itself thus collapsing a portion of the endless loop. A handle forms from a portion of the endless loop which does not collapse.

6 Claims, 5 Drawing Figures

U.S. Patent Nov. 8, 1983 4,413,589
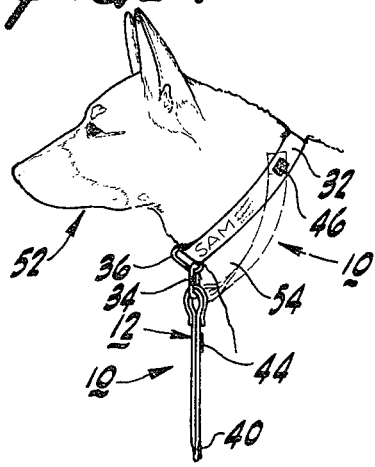
FIG-4
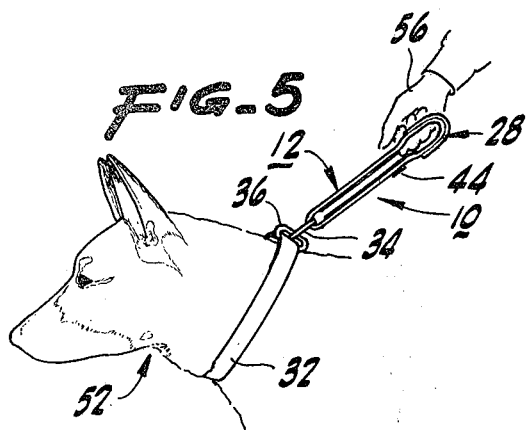
FIG-5
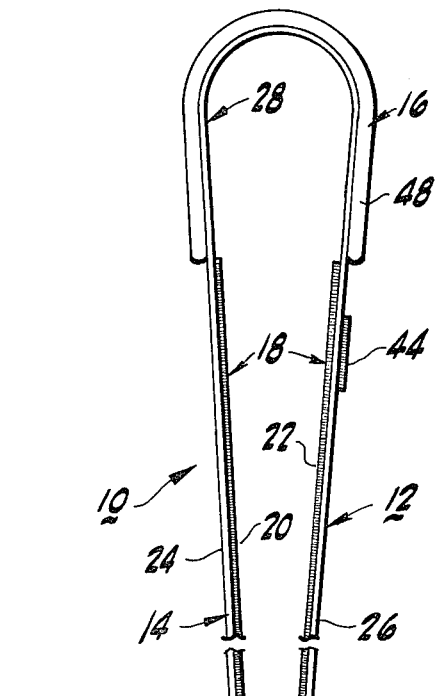
FIG-1
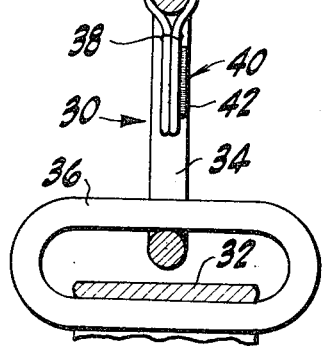
FIG-2
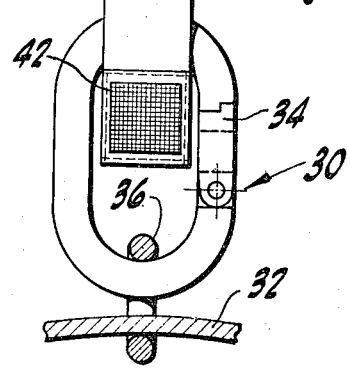
FIG-3
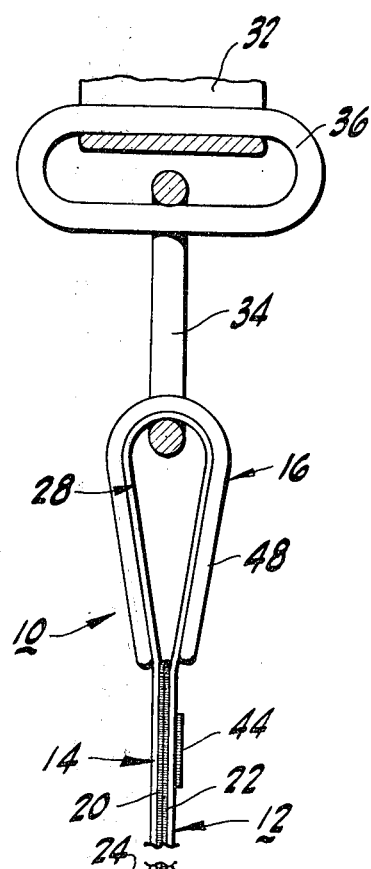
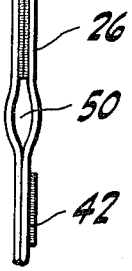

COLLAPSIBLE ANIMAL LEASH

BACKGROUND OF THE INVENTION

The present invention relates to a novel and useful animal leash which is intended to remain secured to the animal collar when the animal is being exercised.

In the past, animal leashes have been developed to control animal movements while they are being walked in areas requiring such control, i.e. a public street. A standard animal leash generally has a clip and a tether with a handle at the end opposite the clip. Adjustment of the length of the tether is accomplished by doubling up or coiling the tether in the hand of the animal trainer.

With animals, such as a large dog, the shortening of the tether portion of the lease is a constant problem. Certain leashes are sold which have a shortened tether portion for employment in conjunction with large animals only. However, any of the heretofore described leashes must be removed from the animal when it is set free and reattached when it is desired to keep the animal close to the master. Releasing the animal with the leash attached poses certain dangers in that the leash may become entangled which will involuntarily arrest the movement of the animal. Also, an animal's paw may be caught in the leash, especially the handle portion of the same, and cause the animal to fall while running.

Animal leashes, such as the one shown in the U.S. Pat. No. 3,776,198, are intended to remain secure to the animal continuously. However, such leash mechanisms are unwieldy and unnecessarily heavy. A leash mechanism which may be safely left on the animal while the animal is set free and usable when the animal is recalled to the master would be a useful article in the pet industry.

SUMMARY OF THE INVENTION

In accordance with the present invention a novel and useful collapsible animal leash for attachment to an animal collar is provided.

The leash of the present invention utilizes an endless loop member and means for holding a portion of the same to itself. Thus, the endless loop member has a portion which is collapsible upon itself. Handle means is also formed from a portion of the endless loop member not capable of being held to itself. The handle means may include a reinforcement section attached to the endless loop for comfort and convenience.

The collapsible animal leash of the present invention may also include a tab connected to and extending from the endless loop. The tab permits the user to easily find that particular portion of the endless loop without seeing the endless loop member itself. The tab may also serve as a point of connection of the endless loop member, collapsed or otherwise, to itself or to the animal collar. A clip may serve as means for connecting the endless loop to the animal collar.

BRIEF DESCRIPTION OF THE DRAWINGS

FIG. 1 is a broken side elevational view of the animal leash of the present invention showing the clip and animal collar in section.

FIG. 2 is a broken front elevational view of the animal leash of the present invention having a broken away portion showing the collapsible portion of the leash and depicting the animal collar in section.

FIG. 3 is a broken side elevational view of the animal leash in its collapsed position and showing the clip in animal collar in section.

FIG. 4 is a side view of the animal leash in the configuration employed when the animal is set free.

FIG. 5 is a side elevational view of the animal leash of the present invention in the configuration employed when the animal is being held by its master.

For a better understanding of the invention, reference is made to the following detailed description.

DESCRIPTION OF THE PREFERRED EMBODIMENTS

Various aspects of the present invention will evolve from the following detailed description of the preferred embodiments thereof, which should be taken in conjunction with the heretofore described drawings.

The invention as a whole is represented by reference character 10 and includes as one of its elements an endless loop member 12, best shown in FIGS. 1-3. Endless loop member 12 includes a collapsible portion 14 and an uncollapsible portion 16. Means 18 is provided for holding collapsible portion 14 together. Means 18 may take the form of a strip of hook material 20 and a strip of pile material 22 which interlocks with one another. Hook strip 20 would be sewn or otherwise connected to loop portion 24 while pile strip 22 would be connected in the same manner to loop portion 26. Uncollapsible portion 16 forms into handle means 28, the use of which will be described hereinafter.

Means 30 permits the connecting of endless loop 12 to animal collar 32 as depicted in the drawings. Means 30 may take the form of a spring loaded clip 34 which engages ring 36 which is itself looped around animal collar 32. Ring 36 is typically employed to hold animal identification tags and a conventional leash. Endless loop member 12 may be formed by solid or otherwise connecting loop portions 24 and 26 at connection place 38. It should be noted that loop portions 24 and 26 are continuous through handle means 28. Tab 40 may be formed beyond connection place 38. Tab 40 may include a closure patch 42 which may mate with closure patch 44 found on loop portion 26 or closure patch 46 found on animal collar 32, FIG. 4. Closure patches 42, 44, and 46 may be of the hook and pile variety, snaps, or any other means which permits the holding of tab 40 to either loop portion 26 or animal collar 32. By this structure, collapsed loop member 12 may be prevented from dangling from animal collar 32 as shown in FIG. 3.

Endless loop member may be constructed of strong webbing material such as nylon. In addition, handle means 28 may have a reinforcement section 48 which would provide same comfort and which would facilitate the gripping of handle means 28. Reinforcement section 48 may be padded nylon, leather, and the like. In addition, hook and pile strips 20 and 22 may be attached to loop portions 24 and 26 leaving a small uncollapsible loop 50, FIG. 3, whose function will be hereinafter described.

In operation, the user would connect endless loop member 12 to animal collar 32 via clip 34 and ring 36. At this point the user possesses the option of letting the animal, such as dog 52, FIGS. 4 and 5, run free or to be tethered. FIG. 4 represents dog 52 in the running free mode. As may be seen, endless loop member 12 dangles from animal collar 32 and is in a collapsed position. Thus the animal is not able to catch leash 10 on a stray object or to place his paw through endless loop member 12. In addition, tab 40 may be held to closure patch 44 or closure patch 46 to reduce the length of endless loop member 12 dangling from animal collar 32. It should be noted, that closure patch 46 may be positioned on animal collar 32 to obviate any formation of a loop between animal collar 32 and endless loop member 12. However, for the sake of illustration, a loop 54 is depicted on FIG. 4. In this regard, FIG. 3 represents leash 10 in the position shown in FIG. 4, i.e. when the dog is running free.

Turning to FIG. 5, it may be seen that leash 10 may also be used to tether or hold dog 52 when dog is heeled or held by his master's hand 56. To convert leash 10 from its collapsed position to its open position, the user inserts his finger through the uncollapsed portion 16 of endless loop member 12 and moves the finger toward tab 40 separating hook and pile strips 20 and 22. Handle means 28 is then pulled causing clip 34 to lie in uncollapsible loop 50 (open position) as shown in FIGS. 1 and 2. At this point, handle means 28 is reversed from its position next to collar 32 to a position at the extremity of leash 10 away from collar 32. FIG. 5 depicts the use of leash 10 in this mode. The user may also open endless loop member 12 by inserting his finger into uncollapsed loop 50, FIG. 3, and running his finger toward handle means 28. Tab 40 may be easily found in complete darkness and serve as a guide for the master's finger.

While in the foregoing embodiments of the present invention have been set forth in considerable detail for the purpose of making a complete disclosure of the invention, it may be apparent to those of skill in the art that numerous changes may be made in such details without departing from the spirit and principles of the invention.

What is claimed is:

1. A collapsible animal leash for attachment to an animal collar comprising:

a. an endless loop member;

b. means for releasibly holding a majority portion of the endless loop member to itself and fully collapsing said majority portion of said endless loop member, said fully collapsed majority portion of said endless loop member being free of exposed loops;

c. handle means formed from a majority portion of the endless loop member not capable of being held to itself by said means for releasibly holding a portion of said endless loop member;

d. means for connecting said endless loop member to the animal collar; said handle means being capable of serving as a proximal portion of said endless loop member in relation to the animal collar when said endless loop member is in a collapsed configuration, said handle means further being capable of serving as the distal portion of said endless loop member in relation to the animal collar when said endless loop member is in an uncollapsed configuration without disconnection of said endless loop member from the animal collar.

2. The collapsible animal leash of claim 1 which additionally comprises a tab connected to and extending from said endless loop.

3. The collapsible animal leash of claim 2 in which said means for connecting said endless loop member to the animal collar comprises a clip.

4. The collapsible animal leash of claim 3 in which handle means includes a reinforcement section attached to said endless loop.

5. The collapsible animal leash of claim 1 which additionally comprises means for folding said endless loop member to itself, said endless loop member being selectively in a collapsed or uncollapsed configuration.

6. The collapsible animal leash of claim 1 which additionally comprises means for holding said endless loop member against the animal collar at a place selectively spaced from said connection of said endless loop to the animal collar.

* * * * *